(12) United States Patent
Park et al.

(10) Patent No.: US 10,688,478 B2
(45) Date of Patent: Jun. 23, 2020

(54) METHOD FOR PREPARING METAL CATALYST-SUPPORTED POROUS SILICON CARBIDE STRUCTURE

(71) Applicant: Korea Institute of Science and Technology, Seoul (KR)

(72) Inventors: Sang Whan Park, Seoul (KR); Mi Rae Youm, Seoul (KR); Sung Il Yun, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 21 days.

(21) Appl. No.: 16/169,176

(22) Filed: Oct. 24, 2018

(65) Prior Publication Data

US 2019/0160454 A1    May 30, 2019

(30) Foreign Application Priority Data

Nov. 28, 2017  (KR) .................. 10-2017-0160113

(51) Int. Cl.
 *B01J 27/224*  (2006.01)
 *B01J 37/02*  (2006.01)
 (Continued)

(52) U.S. Cl.
 CPC .......... *B01J 27/224* (2013.01); *B01J 35/023* (2013.01); *B01J 35/04* (2013.01); *B01J 35/1014* (2013.01);
 (Continued)

(58) Field of Classification Search
 CPC ........ B01J 27/224; B01J 35/023; B01J 35/04; B01J 35/1014; B01J 35/1061;
 (Continued)

(56) References Cited

U.S. PATENT DOCUMENTS 6,251,819 B1 * 6/2001 Prin .................. B01J 27/224
 501/80
7,648,932 B2 * 1/2010 Weisensel ............. C04B 35/573
 264/43
(Continued)

FOREIGN PATENT DOCUMENTS

CN  10 4174420  * 12/2014 ............ B01J 27/224
KR  10-2008-0034804 A  4/2008
(Continued)

OTHER PUBLICATIONS

Sung-Ho Yun et al., "Effects of Amounts of Carbon Source and Infiltrated Si on the Porosity and Fracture Strength of Porous Reaction Bonded SiC." Journal of the Korean Ceramic Society, vol. 44, No. 7, pp. 381-386. (Year: 2007).*

(Continued)

*Primary Examiner* — Patricia L. Hailey
(74) *Attorney, Agent, or Firm* — NSIP Law

(57) ABSTRACT

The present invention relates to a method for preparing a metal catalyst (Ni, Co, etc.)-supported porous silicon carbide structure having meso- to macro-sized pores, high porosity and superior mechanical properties. Unlike the existing method wherein a porous silicon carbide structure is prepared and then the metal catalyst is infiltrated therein, the preparation of the porous silicon carbide structure and the supporting of the metal catalyst occur at the same time by the mixing metal catalyst material and starting materials. As a result, the metal catalyst is distributed uniformly in the porous silicon carbide structure and it is possible to locate a desired amount of the metal catalyst inside the porous silicon carbide structure.

17 Claims, 1 Drawing Sheet

(51) Int. Cl.
*B01J 37/00* (2006.01)
*B01J 37/08* (2006.01)
*B01J 35/04* (2006.01)
*B01J 35/02* (2006.01)
*B01J 37/04* (2006.01)
*B01J 35/10* (2006.01)
*B01J 23/75* (2006.01)
*B01J 23/755* (2006.01)

(52) U.S. Cl.
CPC ....... *B01J 37/0027* (2013.01); *B01J 37/0045* (2013.01); *B01J 37/0063* (2013.01); *B01J 37/0207* (2013.01); *B01J 37/0215* (2013.01); *B01J 37/04* (2013.01); *B01J 37/08* (2013.01); *B01J 23/75* (2013.01); *B01J 23/755* (2013.01); *B01J 2523/845* (2013.01); *B01J 2523/847* (2013.01)

(58) Field of Classification Search
CPC ................ B01J 35/1066; B01J 35/1071; B01J 37/0027; B01J 37/0045; B01J 37/0063; B01J 37/0207; B01J 37/0215; B01J 37/04; B01J 37/08; B01J 23/75; B01J 23/755; B01J 2523/845; B01J 2523/847
USPC ............................. 502/178, 325, 337; 501/88
See application file for complete search history.

(56) References Cited

U.S. PATENT DOCUMENTS

| | | | | |
|---|---|---|---|---|
| 2013/0243682 | A1* | 9/2013 | Park | C01B 32/956 423/346 |
| 2015/0191401 | A1* | 7/2015 | Liu | B01J 35/0006 518/715 |
| 2019/0144287 | A1* | 5/2019 | Park | C01B 32/963 264/5 |

FOREIGN PATENT DOCUMENTS

| | | |
|---|---|---|
| KR | 10-1226522 B1 | 1/2013 |
| KR | 10-2017-0046922 A | 5/2017 |
| WO | WO 2014/207096 A1 | 12/2014 |

OTHER PUBLICATIONS

Mi Rae Youm et al., "Synthesis of b-SiC powders by the carbothermal reduction of porous SiO2—C hybrid precursors with controlled surface area." Ceramics International, pp. 1-8. (Year: 2019).*

A. R. de la Osa et al., "FTS fuels production over different Co/SiC catalysts." Catalysis Today 187, pp. 173-182. (Year: 2012).*

Leroi, Pascaline, et al. "Ni/SiC: a stable and active catalyst for catalytic partial oxidation of methane." *Catalysis Today*, 91, 2004, (pp. 53-58).

* cited by examiner

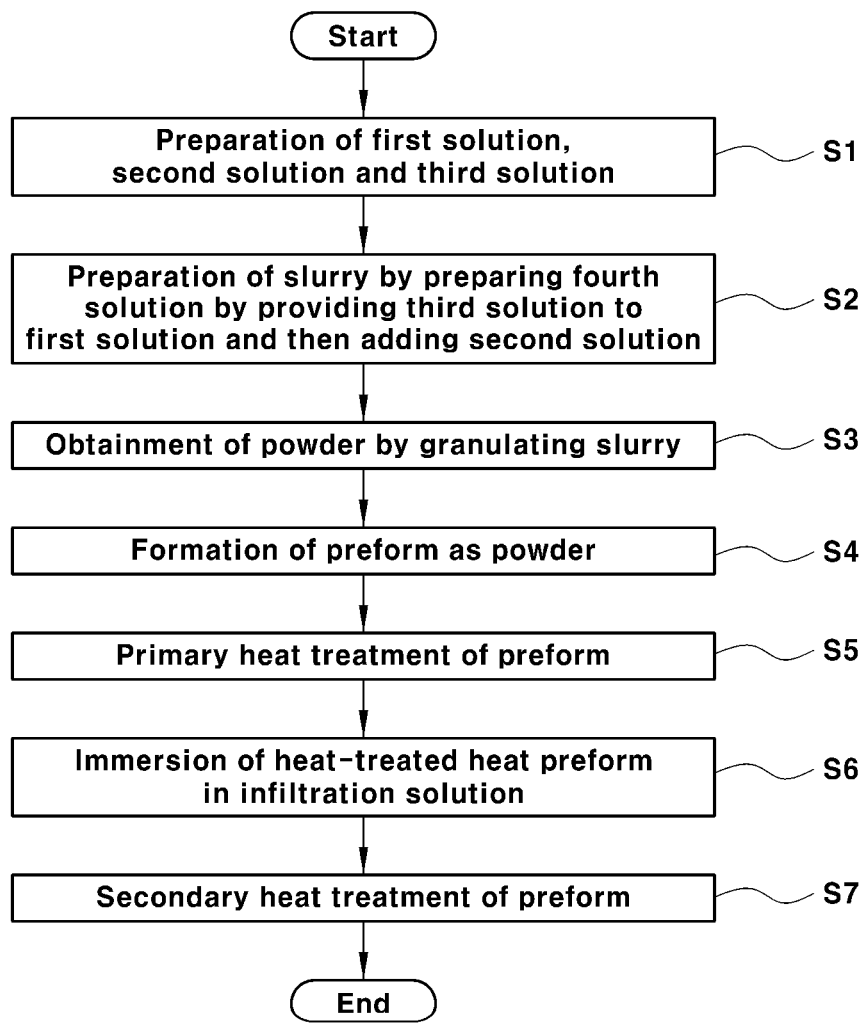

METHOD FOR PREPARING METAL CATALYST-SUPPORTED POROUS SILICON CARBIDE STRUCTURE

CROSS-REFERENCE TO RELATED APPLICATIONS

This application claims the benefit under 35 U.S.C. § 119(a) of Korean Patent Application No. 10-2017-0160113, filed on Nov. 28, 2017, in the Korean Intellectual Property Office, the entire disclosure of which is incorporated herein by reference for all purposes.

BACKGROUND

(a) Technical Field

The present invention relates to a novel method for preparing a metal catalyst-supported porous silicon carbide structure, whereby a metal catalyst-supported porous silicon carbide structure is prepared using a metal catalyst together with a carbon source and a silicon source as starting materials.

(b) Background Art

Porous silicon carbide is drawing attentions as a next-generation catalyst support used in various chemical engineering processes, methanol preparation processes and processes for reforming a catalyst for preparing a synthesis gas consisting of $H_2/CO$ used in the preparation of artificial fuels due to the superior thermomechanical properties such as high temperature stability, wear resistance, thermal shock resistance, thermal conductivity, etc. and the superior physicochemical properties of silicon carbide such as corrosion resistance, chemical resistance, etc. of silicon carbide. For the preparation of a synthesis gas consisting of $H_2/CO$, catalytic partial oxidation of methane or catalytic carbon dioxide reforming of methane is employed and a lot of heat is generated during the reforming processes. In general, in the catalytic gas reforming process for preparing artificial fuels, catalytic reforming is conducted using a metal catalyst supported on alumina ($Al_2O_3$) or silica ($SiO_2$). However, because the alumina or silica support is a thermal insulator with low thermal conductivity, it cannot dissipate the heat generated during the catalytic reforming process well and a localized hot spot is formed in the support on which the catalyst is supported. As a result, the catalytic activity is decreased rapidly as carbon deposition occurs on the catalyst surface. In addition, many problems occur in terms of catalytic reforming efficiency due to the failure of the support caused by the clogging of the pores of the support as well as pressure drop inside a reaction tank. Recently, in order to minimize these problems and improve the reliability and efficiency of the catalytic reforming process, a metal catalyst supported on a silicon carbide support, which exhibits superior thermal conductivity, high mechanical strength, superior chemical resistance and excellent mesopore stability under harsh environment, is used in catalytic partial oxidation of methane or catalytic carbon dioxide reforming of methane for preparing a synthesis gas. With the development of a technology for controlling pore structure, the porous silicon carbide structure is developed as a porous material that can be used under harsh industrial environments where the existing porous oxide structures cannot be used.

At present, a metal catalyst-supported silicon carbide support is prepared by preparing a metal catalyst material into a solution, preparing a metal catalyst oxide by infiltrating the solution into a silicon carbide support at low temperature, drying the same and heat-treating the same under an oxidizing atmosphere and then reducing the same under a $H_2$ atmosphere.

The existing metal catalyst-supported porous silicon carbide support is prepared by supporting a metal nitrate on a silicon carbide support prepared through various methods, preparing the same into a metal oxide by calcining at low temperature and then reducing the same at high temperature under a hydrogen atmosphere as reported by Leroi and PCT/EP2014/063503. Most of the currently developed silicon carbide supports are prepared into silicon carbide supports in the form of powders or small cylinders and porous silicon carbide supports with predetermined shapes are developed only partly.

Because the metal catalyst-supported silicon carbide support developed thus far is prepared by supporting a metal catalyst material by infiltrating a solution containing the metal catalyst into a porous silicon carbide support having micro- and mesopores, the metal catalyst material is not uniformly distributed in the whole micro- or mesopores of the silicon carbide support. In addition, because the liquid metal catalyst material infiltrated into the silicon carbide support is dried at different rates depending on the location, the distribution of the metal catalyst material may be different inside and outside the silicon carbide support and it is impossible to prepare a silicon carbide catalyst support in which the metal catalyst is distributed uniformly. The disuniformity of the distribution of the metal catalyst in the silicon carbide support depending on the location will be increased with increasing the size of the silicon carbide support and, accordingly, the catalytic activity and durability of the metal catalyst-supported silicon carbide support will be negatively affected.

REFERENCES OF THE RELATED ART

Patent Document (Patent document 1) PCT/EP2014/063503.

Non-Patent Document (Non-patent document 1) P. Leroi, "Ni/SiC: a stable and active catalyst for catalytic partial oxidation of methane", *Catalysis Today*, 91-92, (2004), 53-58.

SUMMARY

The present invention is directed to solving the problems of the related art described above.

The present invention is directed to providing a silicon carbide catalyst support having high thermal conductivity, superior mechanical properties and predetermined shape, in which a metal catalyst is distributed uniformly, in order to ensure the reliability and marketability of the metal catalyst-supported silicon carbide catalyst support which is beginning to be used in a gas reforming process.

The present invention is also directed to providing a method for preparing a metal catalyst-supported silicon carbide catalyst support having superior mechanical properties and predetermined shape, in which a metal catalyst such as Ni, Co, etc. is distributed uniformly, in order to extend the application of a Ni or Co metal catalyst-supported silicon carbide support in the catalytic partial oxidation of methane or catalytic carbon dioxide reforming of methane for preparation of a synthesis gas consisting of $H_2$/CO by ensuring durability or reliability.

The purposes of the present invention are not limited to those described above. The purposes of the present invention will be apparent from the following description and will be embodied by the means described in the appended claims and combinations thereof.

The method for preparing a metal catalyst-supported porous silicon carbide structure according to the present invention includes: a step of preparing a first solution wherein a carbon source is dispersed in a solvent, a second solution wherein a silicon source is dispersed in a solvent and a third solution wherein a metal catalyst precursor is dissolved; a step of preparing a slurry by preparing a fourth solution containing the carbon source on which a metal catalyst derived from the metal catalyst precursor is supported by providing the third solution to the first solution and mixing the same and then adding the second solution to the fourth solution and mixing the same; a step of obtaining a powder wherein the metal catalyst-supported carbon source is coated on the surface of the silicon source by granulating the slurry; a step of forming a preform of a predetermined shape from the powder; a step of primarily heat-treating the preform; a step of obtaining a preform infiltrated with a phenolic resin and carbon black by immersing the heat-treated preform in an infiltration solution wherein a phenolic resin and carbon black are dispersed and then drying the same; and a step of secondarily heat-treating the preform infiltrated with the phenolic resin and the carbon black.

The carbon source may be selected from carbon black having an average particle diameter ($d_{50}$) of 0.08-45 μm, a carbon nanotube having a length of 10-30 μm and a combination thereof, and the carbon source may be dispersed at 3-5 wt % in the first solution.

The silicon source may be a silicon powder having an average particle diameter of 0.2-10 μm, and the silicon source may be dispersed at 3-5 wt % in the second solution.

The metal catalyst precursor may be a nitrate of a metal catalyst selected from a group consisting of nickel (Ni), cobalt (Co) and a combination thereof, and the metal catalyst precursor may be dissolved at 10-20 wt % in the third solution.

A molar ratio (C/Si) of the carbon source and the silicon source may be 1.0-2.5, and the slurry may be prepared such that the content of the metal catalyst derived from the metal catalyst precursor is 1-9 wt % based on the total weight of the carbon source and the silicon source.

The fourth solution may be prepared by providing the third solution to the first solution and then stirring the same under a vacuum atmosphere of 1 atm or lower.

Before adding the second solution to the fourth solution, a silane-based binder selected from a group consisting of hexadecyltrimethoxysilane, trimethoxymethylsilane, trimethoxy(propyl)silane, trimethoxyhexylsilane and a mixture thereof may be further added to the fourth solution.

Before granulating the slurry, a processing aid selected from a group consisting of polyvinyl butyral (PVB), polyvinyl alcohol (PVA), polyvinylpyrrolidone (PVP) and a mixture thereof may be added to the slurry.

The granulation of the slurry may be performed by drying the slurry under a vacuum atmosphere at 20-40° C. for 30-60 minutes such that the solvent remains at a content of 1-5 wt %.

The powder wherein the metal catalyst-supported carbon source is coated on the surface of the silicon source obtained by granulating the slurry may have an average particle diameter of 45-300 μm.

The primary heat treatment may be performed by raising temperature to 1000-1400° C. at a rate of 1-3° C./min and then heat-treating the preform for 10-24 hours under an inert atmosphere.

5-10 wt % of a mixture of the phenolic resin and the carbon black at a weight ratio of 10:90 to 30:70 may be dispersed in the infiltration solution.

The heat-treated preform may be immersed in the infiltration solution under a vacuum atmosphere of 1 atm or lower.

The secondary heat treatment may be performed by raising temperature to 900-1200° C. at a rate of 1-3° C./min and then heat-treating the preform infiltrated with the phenolic resin and the carbon black for 5-10 hours.

The method may further include, after the secondary heat treatment is completed, a step of removing the carbon remaining in the metal catalyst-supported porous silicon carbide structure through oxidation.

The metal catalyst-supported porous silicon carbide structure may have a specific surface area of 40-100 $m^2$/g, an average pore size of 5-1000 nm, a porosity of 60-80%, a compressive strength of 10-30 MPa, a metal catalyst size of 2-20 nm and a metal catalyst content of 1-7 wt % based on the total weight of the metal catalyst-supported porous silicon carbide structure.

According to the preparation method of the present invention, a process of supporting a metal catalyst such as Ni or Co on a previously formed porous structure may be omitted, the preparation process can be simplified by supporting the metal catalyst such as Ni or Co while preparing the porous structure and a uniform distribution of the metal catalyst such as Ni or Co can be achieved.

With the smaller the pore size of the porous silicon carbide structure and the larger the size of the porous silicon carbide structure, it is very difficult to support the metal catalyst on the porous structure. Therefore, the existing methods are limited in achieving a uniform distribution of the metal catalyst supported on the porous structure and in the amount of the metal catalyst that can be supported. In contrast, the metal catalyst-supported porous silicon carbide structure prepared according to the present invention allows selective supporting of a desired amount of a metal catalyst such as Ni or Co during a process of mixing starting materials and the metal catalyst (Ni or Co, etc.)-supported porous structure with superior function can be prepared because the supported metal catalyst exists inside the porous structure with a uniform distribution.

The effect of the present invention is not limited to that described above. It is to be understood that the effect of the present invention includes all the effects that can be inferred from the following description.

BRIEF DESCRIPTION OF DRAWING

FIG. 1 schematically describes a method for preparing a metal catalyst-supported porous silicon carbide structure according to the present invention.

DETAILED DESCRIPTION

Other objectives, features and advantages of the present invention will be easily understood through the following detailed description of specific exemplary embodiments and the attached drawings. However, the present invention is not limited to the exemplary embodiments and may be embodied in other forms. On the contrary, the exemplary embodiments are provided so that the disclosure of the present invention is completely and fully understood by those of ordinary skill.

In the attached drawings, like numerals are used to represent like elements. In the drawings, the dimensions of the elements are magnified for easier understanding of the present invention. Although the terms first, second, etc. may be used to describe various elements, these elements should not be limited by the terms. The terms are used only to distinguish one element from another. For example, a first element can be termed a second element and, similarly, a second element can be termed a first element, without departing from the scope of the present invention. A singular expression includes a plural expression unless the context clearly indicates otherwise.

In the present disclosure, the terms such as "include", "contain", "have", etc. should be understood as designating that features, numbers, steps, operations, elements, parts or combinations thereof exist and not as precluding the existence of or the possibility of adding one or more other features, numbers, steps, operations, elements, parts or combinations thereof in advance. In addition, when an element such as a layer, a film, a region, a substrate, etc. is referred to as being "on" another element, it can be "directly on" the another element or an intervening element may also be present. Likewise, when an element such as a layer, a film, a region, a substrate, etc. is referred to as being "under" another element, it can be "directly under" the another element or an intervening element may also be present.

Unless specified otherwise, all numbers, values and/or expressions that represent the components, reaction conditions and the quantity polymer compositions and mixtures used in the present invention represent approximate measures or limits to ranges to encompass minor deviations from the given values and are to be understood to be modified by "about". Also, the numerical ranges described in this disclosure are continuous and include all the values from the minimum value to the minimum value included in the ranges, unless specified otherwise. In addition, if the range indicates integers, all the integers from the minimum value to the minimum value are included.

Throughout this disclosure, the numerical ranges described for parameters are to be understood to include all the values included in the ranges including the described end points. For example, a range of "5-10" is to be understood to include not only the values 5, 6, 7, 8, 9 and 10 but also the subranges thereof such as 6-10, 7-10, 6-9, 7-9, etc. and any values between appropriate integers in the ranges such as 5.5, 6.5, 7.5, 5.5-8.5, 6.5-9, etc. In addition, a range of "10-30%", for example, is to be understood to include not only all the inter values 10%, 11%, 12%, 13%, . . . , 30% but also the subranges thereof such as 10-15%, 12-18%, 20-30%, etc. and any values between appropriate integers in the ranges such as 10.5%, 15.5%, 25.5%, etc.

FIG. 1 schematically describes a method for preparing a metal catalyst-supported porous silicon carbide structure according to the present invention. Referring to the FIGURE, the preparation method includes a step of preparing a first solution wherein a carbon source is dispersed in a solvent, a second solution wherein a silicon source is dispersed in a solvent and a third solution wherein a metal catalyst precursor is dissolved (S1), a step of preparing a slurry by preparing a fourth solution containing the carbon source on which a metal catalyst derived from the metal catalyst precursor is supported by providing the third solution to the first solution and mixing the same and then adding the second solution to the fourth solution and mixing the same (S2), a step of obtaining a powder wherein the metal catalyst-supported carbon source is coated on the surface of the silicon source by granulating the slurry (S3), a step of forming a preform of a predetermined shape from the powder (S4), a step of primarily heat-treating the preform (S5), a step of obtaining a preform infiltrated with a phenolic resin and carbon black by immersing the heat-treated preform in an infiltration solution wherein a phenolic resin and carbon black are dispersed and then drying the same (S6) and a step of secondarily heat-treating the preform infiltrated with the phenolic resin and the carbon black (S7).

The present invention is characterized in that, unlike the existing method of preparing a porous structure first using a carbon source and a silicon source and then supporting a metal catalyst on the porous structure, the metal catalyst-supported porous silicon carbide structure is prepared by including a metal catalyst precursor in the starting materials themselves.

The first solution is prepared by dispersing a carbon source in a solvent.

The carbon source may be selected from carbon black having an average particle diameter ($d_{50}$) of 0.08-45 μm and a specific surface area of 80-200 $m^2/g$, a carbon nanotube having a length of 10-30 μm and a combination thereof. The average particle diameter ($d_{50}$) refers to a median diameter ($d_{50}$) obtained from the volume-based particle size distribution reduced to a sphere equivalent diameter through laser diffraction particle size analysis (wet method).

If the average particle diameter ($d_{50}$) of the carbon black is smaller than 0.08 μm, the carbon source may not be dispersed uniformly in the first solution. And, if it exceeds 45 μm, the mechanical properties of the porous silicon carbide structure as well as the pore characteristics of the porous silicon carbide structure such as porosity, pore size and pore distribution are negatively affected. If the specific surface area of the carbon black is smaller than 80 $m^2/g$, the pore characteristics of the prepared porous silicon carbide structure are unsatisfactory. And, if it exceeds 200 $m^2/g$, it may be difficult to prepare the preform.

The carbon nanotube may be selected from a group consisting of a single-walled carbon nanotube (SWCNT), a double-walled carbon nanotube (DWCNT), a multi-walled carbon nanotube (MWCNT) and a mixture thereof.

The specific surface area, compressive strength, porosity, etc. of the porous silicon carbide structure may be controlled easily by controlling the composition of the carbon source, which will be described later through examples.

The carbon source may be dispersed by adding at 3-5 wt % to the solvent based on 100 wt % of the first solution.

The method for dispersing the carbon source in the solvent is not particularly limited. For example, it may be dispersed through ball milling, sonication, etc. Also, the dispersing time is not particularly limited and the dispersion may be performed until the carbon source is dispersed uniformly enough.

The second solution is dispersed by dispersing the silicon source in the solvent.

The silicon source may be a silicon powder having an average particle diameter of 0.2-10 μm, specifically 5 μm. If the average particle diameter is smaller than 0.2 μm, the prepared porous silicon carbide structure may be economically ineffective. And, if it exceeds 10 μm, the pore characteristics and mechanical properties of the prepared porous silicon carbide structure may be unsatisfactory because the gas-phase silicon source produced from the solid-phase silicon source contributes to the pore characteristics (pore size and pore distribution) of the porous silicon carbide structure. The specific surface area, compressive strength, porosity, etc. of the porous silicon carbide structure may be controlled easily by controlling the average particle diameter of the silicon source, which will be described later through examples.

The silicon source may be dispersed by adding at 3-5 wt % to the solvent based on 100 wt % of the second solution.

The method for dispersing the silicon source in the solvent is not particularly limited. For example, it may be dispersed through ball milling, sonication, etc. Also, the dispersing time is not particularly limited and the dispersion may be performed until the silicon source is dispersed uniformly enough.

The solvent of the first solution and the second solution may be selected from a group consisting of ethanol, isopropyl alcohol (IPA) and a mixture thereof.

The third solution is a solution in which a metal catalyst precursor is dissolved.

The metal catalyst precursor is a nitrate of a metal catalyst selected from a group consisting of nickel (Ni), cobalt (Co) and a combination thereof.

The metal catalyst precursor is dissolved in the third solution at 10-20 wt %.

The solvent of the third solution is not particularly limited and any one having high solubility for the nitrate of the metal catalyst may be used.

In the step of preparing the slurry (S2), a fourth solution is prepared first by adding the third solution containing the metal catalyst precursor to the first solution containing the carbon source and mixing the same and then the second solution containing the silicon source is added to the fourth solution.

The slurry may be prepared by adjusting the amount of the first to fourth solutions such that the molar ratio (C/Si) of the carbon source and the silicon sources is 1.0-2.5 and the content of the metal catalyst derived from the metal catalyst precursor is 1-9 wt % based on the total weight of the carbon source and the silicon source.

When adding the third solution containing the metal catalyst precursor to the first solution containing the carbon source and mixing the same, the addition and mixing may be performed specifically under a vacuum atmosphere of 1 atm or lower such that the metal catalyst derived from the metal catalyst precursor is sufficiently supported on the carbon source.

Before adding the second solution to the fourth solution and the second solution to the fourth solution, a silane-based binder selected from a group consisting of hexadecyltrimethoxysilane, trimethoxymethylsilane, trimethoxy(propyl)silane, trimethoxyhexylsilane and a mixture thereof may be further added to the fourth solution.

The silane-based binder serves to attach the carbon source onto the surface of the silicon source. The content of the silane-based binder may be 0.3-1 wt % based on 100 wt % of the carbon source.

Then, the slurry is prepared by adding the second solution to the fourth solution and mixing the same. Specifically, the second solution may be added little by little while stirring the fourth solution such that the carbon source (metal catalyst-supported carbon source) is uniformly coated on the surface of the silicon source. The method and speed of the addition of the second solution are not particularly limited. For example, the second solution may be added by freely dropping through a tube having a small diameter.

After the second solution is added, the mixing may be performed sufficiently at 200-400 rpm.

Before granulating the slurry, a processing aid may be dispersed in the slurry. The processing aid is used for easily forming the preform in the form of a powder in the following step. The processing aid may be selected from a group consisting of polyvinyl butyral (PVB), polyvinyl alcohol (PVA), polyvinylpyrrolidone (PVP) and a mixture thereof and its content may be 0.3-0.5 wt % based on 100 wt % of the carbon source and the silicon source. If the content is smaller than 0.3 wt %, the effect of adding the processing aid cannot be achieved. And, if it exceeds 0.5 wt %, the physical properties, etc. of the porous silicon carbide structure may be negatively affected.

In the step of granulating the slurry (S3), a powder wherein the metal catalyst-supported carbon source is coated on the surface of the silicon source is obtained.

In the process of preparing the powder by drying the slurry, the granulation may be performed through stirring vacuum drying or partial drying in order to prevent separation due to the difference in the size of the silicon source and the carbon source. Here, the 'stirring vacuum drying' refers to a method of stirring the slurry using a rotary evaporator and drying the same using a water pump while maintaining a vacuum state.

Specifically, the slurry may be granulated by drying under a vacuum atmosphere at 20-40° C. for 30-60 minutes such that the solvent remains with a low content, specifically 1-5 wt %.

The powder obtained through the granulation may have an average particle diameter of 45-300 μm.

In the step of forming the preform (S4), a preform with a predetermined shape is formed by compressing the powder.

Because the preform with a predetermined shape is prepared first as described above and then the porous silicon carbide structure is prepared by direct carbonization or carbothermal reduction rather than porous silicon carbide powders are prepared and then the structure is prepared by compressing the same, the compressive strength can be improved remarkably.

The conditions of the compression are not particularly limited. For example, the preform may be formed by compressing the powder wherein the carbon source is coated on the surface of the silicon source at 0.3-1 MPa.

The shape of the preform is not particularly limited and may be selected adequately depending on applications, etc.

In the step of primarily heat-treating the preform (S5), the porous silicon carbide structure is formed by heating the preform to cause a reaction between the silicon source and the carbon source.

The primary heat treatment may be performed by raising temperature to 1000-1400° C. at a rate of 1-3° C./min and then heat-treating the preform for 10-24 hours under an inert atmosphere.

The reaction between the silicon source and the carbon source through the primary heat treatment may be direct carbonization or carbothermal reduction. Specifically, silicon carbide may be synthesized by reacting the silicon source in the gas phase with the carbon source at a temperature below the melting point of silicon.

Because some of the metal catalyst reacts with the silicon source during primary heat treatment, a metal silicide is formed in the porous preform.

In the step of immersing the heat-treated preform in an infiltration solution (S7) and the secondarily heat-treating the same (S7), the metal silicide remaining in the preform is converted to the metal catalyst.

5-10 wt % of a mixture of a phenolic resin and carbon black at a weight ratio of 10:90 to 30:70 may be dispersed in the infiltration solution.

Specifically, the heat-treated preform may be immersed in the infiltration solution under a vacuum atmosphere of 1 atm or lower such that the phenolic resin and the carbon black can effectively infiltrate into the porous preform.

The preform infiltrated with a phenolic resin and carbon black is obtained by immersing the porous preform for a predetermined time and then drying the same. The immersion and drying may be repeated 3-5 times until the weight of the preform infiltrated with the phenolic resin and the carbon black is increased by about 10 wt % as compared to the weight of the porous preform before the infiltration. It is to ensure sufficient infiltration of the phenolic resin and the carbon black into the porous preform.

The preform infiltrated with the phenolic resin and the carbon black are secondarily heat-treated (S7) in order to convert the metal silicide remaining in the preform to the metal catalyst.

The secondary heat treatment may be performed by raising temperature to 900-1200° C. at a rate of 1-3° C./min and then heat-treating the preform infiltrated with the phenolic resin and the carbon black for 5-10 hours.

After the secondary heat treatment is completed, the carbon remaining in the metal catalyst-supported porous silicon carbide structure may be removed through oxidation at about 700° C. or lower.

The metal catalyst-supported porous silicon carbide structure prepared according to the present invention may have a specific surface area of 40-100 $m^2/g$, an average pore size of 5-1000 nm, a porosity of 60-80%, a compressive strength of 10-30 MPa, a metal catalyst size of 2-20 nm and a metal catalyst content of 1-7 wt % based on the total weight of the metal catalyst-supported porous silicon carbide structure.

The average pore size refers to the size of pores formed inside the porous silicon carbide structure measured by the mercury intrusion porosimetry, the porosity refers to the fraction of the volume occupied by the pores based on the total volume of the porous silicon carbide structure and the compressive strength refers to the strength of the prepared porous silicon carbide structure measured according to ASTM C773.

Based on the average pore size, it can be said that the metal catalyst-supported porous silicon carbide structure has meso- or macro-sized pores.

The present invention will be described in more detail through examples. The following examples are for illustrative purposes only and it will be apparent to those skilled in the art that the scope of this invention is not limited by the examples.

Examples 1-4

In order to prepare a metal catalyst (Ni)-supported porous silicon carbide structure having meso- or macro-sized pores, a silicon powder with an average particle diameter of 3 μm was used as a silicon source and carbon black with an average particle size ($d_{50}$) of 0.08 μm and a specific surface area of 80 $m^2/g$ was used as a carbon source.

The carbon black used as the carbon source was wet-mixed in isopropyl alcohol (IPA) to a content of 5 wt % (based on 100 wt % of a first solution). The wet mixing was performed for 12 hours by ball milling using SiC balls with a size of 2 mm or smaller. For uniform dispersion of the carbon black, sonication was performed for 1 hour to prepare a first solution.

After adding the silicon powder used as the silicon source to isopropyl alcohol (IPA), a second solution in which the silicon powder was dispersed at 10 wt % (based on 100 wt % of the second solution) was prepared by mixing for 12 hours through ball milling.

A third solution in which nickel nitrate hexahydrate was dissolved at 10 wt % as a metal catalyst precursor was prepared.

The third solution was added to the first solution, such that the content of a metal catalyst (Ni) was 3 wt % based on the total weight of the carbon black and the silicon powder. A fourth solution was prepared by adding the third solution to the first solution and stirring under a vacuum atmosphere of 1 atm or lower, such that the metal catalyst (Ni) could sufficiently infiltrate into the carbon black.

A slurry was prepared by adding the second solution little by little while stirring the fourth solution and then stirring the same for 12 hours or longer. The addition amount of the second solution was controlled such that the molar ratio (C/Si) of the carbon source and the silicon source was 1.0 (Example 1), 1.5 (Example 2), 2.0 (Example 3) or 2.5 (Example 4).

After adding methyltrimethoxysilane to the slurry as a silane-based binder, the mixture was mixed homogeneously through ball milling and sonication.

Then, after adding 0.3 wt % of PVB as a processing aid to the slurry based on 100 wt % of the carbon source and the silicon source, the mixture was stirred for 2 hours or longer.

A powder in which metal catalyst-supported carbon source was coated on the surface of the silicon source was prepared by stir-drying the slurry under a vacuum atmosphere.

A preform with a cylinder shape was prepared by compressing the powder with a pressure of 0.6 MPa. The preform was dried at room temperature for 24 hours or longer.

A porous silicon carbide structure with a cylinder shape was synthesized by loading the preform in a tube furnace, raising temperature to 200° C. at a rate of 2° C./min, maintaining the temperature for 1 hour, raising temperature to 600° C. at a rate of 10° C./min, maintaining the temperature for 30 minutes, raising temperature to 1250° C. at a rate of 2° C./min and maintaining the temperature for 10 hours, under an argon atmosphere.

In order to convert nickel silicide remaining in the prepared porous silicon carbide structure to nickel (Ni) metal, the porous silicon carbide structure was immersed in a solution in which a phenolic resin and carbon black were mixed (10:90). In order to enhance the effect of infiltration, the immersion was performed for 5 minutes under a vacuum atmosphere of 1 atm or lower. Then, the porous silicon carbide structure was dried. The infiltration and drying were repeated 3 times, so that the increase in weight due to the infiltration of the phenolic resin and the carbon black was 5 wt %.

Then, a metal catalyst (Ni)-supported porous silicon carbide structure (β-SiC) with an average particle size of 20 nm was prepared by loading the product in a tube furnace, raising temperature to 600° C. at a rate of 2° C./min, maintaining the temperature for 60 minutes, raising temperature to 1200° C. at a rate of 2° C./min and maintaining the temperature for 5 hours, under an argon atmosphere.

Then, the unreacted carbon remaining in the porous silicon carbide structure was removed by oxidizing at 700° C. for 2 hours.

The pore characteristics and mechanical properties of the porous silicon carbide structures prepared in Examples 1-4 are summarized in Table 1.

TABLE 1

| | | Examples | | | |
|---|---|---|---|---|---|
| | | 1 | 2 | 3 | 4 |
| Starting materials | Carbon source | Carbon black | Carbon black | Carbon black | Carbon black |
| | Silicon source | Silicon powder (3 μm) | Silicon powder (3 μm) | Silicon powder (3 μm) | Silicon powder (3 μm) |
| | C/Si (molar ratio) | 1.0 | 1.5 | 2.0 | 2.5 |
| | Metal catalyst precursor | $Ni(NO_3)_2 \cdot 6H_2O$ | $Ni(NO_3)_2 \cdot 6H_2O$ | $Ni(NO_3)_2 \cdot 6H_2O$ | $Ni(NO_3)_2 \cdot 6H_2O$ |
| | Primary heat treatment temperature/time | 1250° C./10 hours | | | |
| | Secondary heat treatment temperature/time | 1200° C./5 hours | | | |
| Porous β-SiC | Specific surface area ($m^2/g$) | 25 | 66 | 82 | 108 |
| | Strength (MPa) | 31 | 21 | 10 | 5 |
| | Porosity (%) | 65 | 68 | 72 | 77 |
| | Ni loading amount (%) | 4.2 wt % | 4.5 wt % | 4.7 wt % | 5.1 wt % |

Examples 5-7

In order to prepare a metal catalyst (Co)-supported porous silicon carbide structure having meso- or macro-sized pores, a silicon powder with an average particle diameter of 3 μm was used as a silicon source and carbon black with an average particle size ($d_{50}$) of 0.08 μm and a specific surface area of 80 $m^2/g$ was used as a carbon source.

The carbon black used as the carbon source was wet-mixed in isopropyl alcohol (IPA) to a content of 5 wt % (based on 100 wt % of a first solution). The wet mixing was performed for 12 hours by ball milling using SiC balls with a size of 2 mm or smaller. For uniform dispersion of the carbon black, sonication was performed for 1 hour to prepare a first solution.

After adding the silicon powder used as the silicon source to isopropyl alcohol (IPA), a second solution in which the silicon powder was dispersed at 10 wt % (based on 100 wt % of the second solution) was prepared by mixing for 12 hours through ball milling.

A third solution in which cobalt nitrate hexahydrate was dissolved at 10 wt % as a metal catalyst precursor was prepared.

The third solution was added to the first solution, such that the content of a metal catalyst (Co) was 3 wt % based on the total weight of the carbon black and the silicon powder. A fourth solution was prepared by adding the third solution to the first solution and stirring under a vacuum atmosphere of 1 atm or lower, such that the metal catalyst (Co) could sufficiently infiltrate into the carbon black.

A slurry was prepared by adding the second solution little by little while stirring the fourth solution and then stirring the same for 12 hours or longer. The addition amount of the second solution was controlled such that the molar ratio (C/Si) of the carbon source and the silicon source was 1.0 (Example 5), 1.5 (Example 6) or 2.0 (Example 7).

After adding methyltrimethoxysilane to the slurry as a silane-based binder, the mixture was mixed homogeneously through ball milling and sonication.

Then, after adding 0.3 wt % of PVB as a processing aid to the slurry based on 100 wt % of the carbon source and the silicon source, the mixture was stirred for 2 hours or longer.

A powder in which metal catalyst-supported carbon source was coated on the surface of the silicon source was prepared by stir-drying the slurry under a vacuum atmosphere.

A preform with a cylinder shape was prepared by compressing the powder with a pressure of 0.6 MPa. The preform was dried at room temperature for 24 hours or longer.

A porous silicon carbide structure with a cylinder shape was synthesized by loading the preform in a tube furnace, raising temperature to 200° C. at a rate of 2° C./min, maintaining the temperature for 1 hour, raising temperature to 600° C. at a rate of 10° C./min, maintaining the temperature for 30 minutes, raising temperature to 1250° C. at a rate of 2° C./min and maintaining the temperature for 10 hours, under an argon atmosphere.

In order to convert cobalt silicide remaining in the prepared porous silicon carbide structure to cobalt (Co) metal, the porous silicon carbide structure was immersed in a solution in which a phenolic resin and carbon black were mixed (10:90). In order to enhance the effect of infiltration, the immersion was performed for 5 minutes under a vacuum atmosphere of 1 atm or lower. Then, the porous silicon carbide structure was dried. The infiltration and drying were repeated 3 times, so that the increase in weight due to the infiltration of the phenolic resin and the carbon black was 5 wt %.

Then, a metal catalyst (Ni)-supported porous silicon carbide structure (β-SiC) with an average particle size of 20 nm was prepared by loading the product in a tube furnace, raising temperature to 600° C. at a rate of 2° C./min, maintaining the temperature for 60 minutes, raising temperature to 1200° C. at a rate of 2° C./min and maintaining the temperature for 5 hours, under an argon atmosphere.

Then, the unreacted carbon remaining in the porous silicon carbide structure was removed by oxidizing at 700° C. for 2 hours.

The pore characteristics and mechanical properties of the porous silicon carbide structures prepared in Examples 5-7 are summarized in Table 2.

TABLE 2

| | | Examples | | |
|---|---|---|---|---|
| | | 5 | 6 | 7 |
| Starting materials | Carbon source | Carbon black | Carbon black | Carbon black |
| | Silicon source | Silicon powder (3 μm) | Silicon powder (3 μm) | Silicon powder (3 μm) |

TABLE 2-continued

| | | Examples | | |
|---|---|---|---|---|
| | | 5 | 6 | 7 |
| | C/Si (molar ratio) | 1.0 | 1.5 | 2.0 |
| | Metal catalyst precursor | $Co(NO_3)_2 \cdot 6H_2O$ | $Co(NO_3)_2 \cdot 6H_2O$ | $Co(NO_3)_2 \cdot 6H_2O$ |
| | Primary heat treatment temperature/time | | 1250° C./10 hours | |
| | Secondary heat treatment temperature/time | | 1200° C./5 hours | |
| Porous β-SiC | Specific surface area ($m^2/g$) | 48 | 66 | 85 |
| | Strength (MPa) | 19 | 21 | 13 |
| | Porosity (%) | 68 | 68 | 74 |
| | Co loading amount | 4.1 wt % | 4.4 wt % | 4.8 wt % |

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

The metal catalyst-supported silicon carbide catalyst support according to the present invention, which exhibits high thermal conductivity and superior mechanical properties and has a predetermined shape because the metal catalyst such as Ni or Co is distributed uniformly, can be used to prevent carbon deposition on the surface of the metal catalyst, improve the carbon efficiency of the metal catalyst and ensure the durability and reliability of the catalyst support in catalytic partial oxidation of methane or catalytic carbon dioxide reforming of methane for the preparation of a synthesis gas consisting of $H_2/CO$ which is used in various chemical engineering processes, methanol preparation processes and artificial fuel preparation processes.

What is claimed is:

1. A method for preparing a metal catalyst-supported porous silicon carbide structure, comprising:
   preparing a first solution wherein a carbon source is dispersed in a solvent, a second solution wherein a silicon source is dispersed in a solvent and a third solution wherein a metal catalyst precursor is dissolved;
   preparing a slurry by preparing a fourth solution comprising the carbon source on which a metal catalyst derived from the metal catalyst precursor is supported by providing the third solution to the first solution and mixing the same and then adding the second solution to the fourth solution and mixing the same;
   obtaining a powder wherein the metal catalyst-supported carbon source is coated on the surface of the silicon source by granulating the slurry;
   forming a preform from the powder;
   primarily heat-treating the preform;
   obtaining a preform infiltrated with a phenolic resin and carbon black by immersing the heat-treated preform in an infiltration solution wherein a phenolic resin and carbon black are dispersed and then drying the same; and
   secondarily heat-treating the preform infiltrated with the phenolic resin and the carbon black.

2. The method for preparing a metal catalyst-supported porous silicon carbide structure according to claim 1, wherein
   the carbon source is selected from the group consisting of carbon black having an average particle diameter ($d_{50}$) of 0.08-45 μm, a carbon nanotube having a length of 10-30 μm and a combination thereof, and
   the carbon source is dispersed at 3-5 wt % in the first solution.

3. The method for preparing a metal catalyst-supported porous silicon carbide structure according to claim 1, wherein
   the silicon source is a silicon powder having an average particle diameter of 0.2-10 μm, and
   the silicon source is dispersed at 3-5 wt % in the second solution.

4. The method for preparing a metal catalyst-supported porous silicon carbide structure according to claim 1, wherein
   the metal catalyst precursor is a nitrate of a metal catalyst selected from the group consisting of nickel (Ni), cobalt (Co) and a combination thereof, and
   the metal catalyst precursor is dissolved at 10-20 wt % in the third solution.

5. The method for preparing a metal catalyst-supported porous silicon carbide structure according to claim 1, wherein
   a molar ratio (C/Si) of the carbon source and the silicon source is 1.0-2.5, and
   the slurry is prepared such that the content of the metal catalyst derived from the metal catalyst precursor is 1-9 wt % based on the total weight of the carbon source and the silicon source.

6. The method for preparing a metal catalyst-supported porous silicon carbide structure according to claim 1, wherein the fourth solution is prepared by providing the third solution to the first solution and then stirring the same under a vacuum atmosphere of 1 atm or lower.

7. The method for preparing a metal catalyst-supported porous silicon carbide structure according to claim 1, wherein, before adding the second solution to the fourth solution, a silane-based binder selected from the group consisting of hexadecyltrimethoxysilane, trimethoxymethylsilane, trimethoxy(propyl)silane, trimethoxyhexylsilane and a mixture thereof is further added to the fourth solution.

8. The method for preparing a metal catalyst-supported porous silicon carbide structure according to claim 1, wherein, before granulating the slurry, a processing aid selected from the group consisting of polyvinyl butyral (PVB), polyvinyl alcohol (PVA), polyvinylpyrrolidone (PVP) and a mixture thereof is added to the slurry.

9. The method for preparing a metal catalyst-supported porous silicon carbide structure according to claim 1, wherein the granulation of the slurry is performed by drying the slurry under a vacuum atmosphere at 20-40° C. for 30-60 minutes such that the solvent remains at a content of 1-5 wt %.

10. The method for preparing a metal catalyst-supported porous silicon carbide structure according to claim 1, wherein the powder obtained by granulating the slurry has an average particle diameter of 45-300 µm.

11. The method for preparing a metal catalyst-supported porous silicon carbide structure according to claim 1, wherein the primary heat treatment is performed by raising temperature to 1000-1400° C. at a rate of 1-3° C./min and then heat-treating the preform for 10-24 hours under an inert atmosphere.

12. The method for preparing a metal catalyst-supported porous silicon carbide structure according to claim 1, wherein 5-10 wt % of a mixture of the phenolic resin and the carbon black at a weight ratio of 10:90 to 30:70 is dispersed in the infiltration solution.

13. The method for preparing a metal catalyst-supported porous silicon carbide structure according to claim 1, wherein the heat-treated preform is immersed in the infiltration solution under a vacuum atmosphere of 1 atm or lower.

14. The method for preparing a metal catalyst-supported porous silicon carbide structure according to claim 1, wherein the secondary heat treatment is performed by raising temperature to 900-1200° C. at a rate of 1-3° C./min and then heat-treating the preform infiltrated with the phenolic resin and the carbon black for 5-10 hours.

15. The method for preparing a metal catalyst-supported porous silicon carbide structure according to claim 1, which further comprises, after the secondary heat treatment is completed, removing the carbon remaining in the metal catalyst-supported porous silicon carbide structure through oxidation.

16. The method for preparing a metal catalyst-supported porous silicon carbide structure according to claim 1, wherein the metal catalyst-supported porous silicon carbide structure has a specific surface area of 40-100 $m^2/g$, an average pore size of 5-1000 nm, a porosity of 60-80%, a compressive strength of 10-30 MPa, a metal catalyst size of 2-20 nm and a metal catalyst content of 1-7 wt % based on the total weight of the metal catalyst-supported porous silicon carbide structure.

17. The method for preparing a metal catalyst-supported porous silicon carbide structure according to claim 1, wherein the preform comprises a cylinder shape.

* * * * *